(12) United States Patent
Aizawa et al.

(10) Patent No.: US 7,376,566 B2
(45) Date of Patent: May 20, 2008

(54) IMAGE FORMING APPARATUS AND METHOD

(75) Inventors: Michio Aizawa, Kanagawa (JP); Tsuyoshi Yagisawa, Kanagawa (JP); Masayuki Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

(21) Appl. No.: 10/754,533

(22) Filed: Jan. 12, 2004

(65) Prior Publication Data
US 2004/0143441 A1 Jul. 22, 2004

(30) Foreign Application Priority Data
Jan. 20, 2003 (JP) ............. 2003-011273

(51) Int. Cl.
*G10L 21/00* (2006.01)
(52) U.S. Cl. ............ 704/275; 704/270; 704/235; 704/246; 382/118; 358/1.14
(58) Field of Classification Search ........ 704/270, 704/273, 275, 246, 235, 249; 713/186; 379/88.14; 382/118; 396/313; 358/1.14
See application file for complete search history.

(56) References Cited

U.S. PATENT DOCUMENTS

| 4,931,950 | A | * | 6/1990 | Isle et al. .................. 706/11 |
| 5,787,396 | A | | 7/1998 | Komori et al. ............. 704/256 |
| 5,797,116 | A | | 8/1998 | Yamada et al. ............ 704/10 |
| 5,890,182 | A | | 3/1999 | Yagisawa et al. ......... 707/535 |
| 6,108,628 | A | * | 8/2000 | Komori et al. ............. 704/256 |
| 6,567,176 | B1 | * | 5/2003 | Jeyachandran et al. .... 358/1.14 |
| 6,662,159 | B2 | | 12/2003 | Komori et al. ............. 704/255 |
| 6,768,722 | B1 | * | 7/2004 | Katseff et al. ............. 370/260 |
| 2001/0056346 | A1 | | 12/2001 | Ueyama et al. ............ 704/246 |
| 2003/0158735 | A1 | | 8/2003 | Yamada et al. ............ 704/260 |
| 2003/0229496 | A1 | | 12/2003 | Yamada et al. ............ 704/258 |
| 2004/0019149 | A1 | | 1/2004 | Yamada .................... 704/275 |

FOREIGN PATENT DOCUMENTS

JP 11-136490 5/1999
JP 2000-115327 4/2000

* cited by examiner

*Primary Examiner*—Vijay B Chawan
(74) *Attorney, Agent, or Firm*—Fitzpatrick, Cella, Harper & Scinto

(57) ABSTRACT

Provided are an image forming apparatus and an image forming method in which a decline in the recognition rate of voice recognition ascribable to operating sound during printing can be prevented by starting voice recognition after the printing operation has been suspended. The image forming apparatus is provided with a voice recognition unit (103) for recognizing entered voice, and a image printing unit (107) for printing prescribed print information. Whether the image printing unit (107) is currently printing is discriminated by an image-printing-state holding unit (106). Further, a request to start operation of a voice recognition unit (103) is accepted. If the request to start operation of the voice recognition unit (103) is accepted during printing of print information by the image printing unit (107), then printing of the print information by the image printing unit (107) is suspended. The state of a voice-recognition-state holding unit (102) is then changed and the voice recognition unit (103) starts performing recognition of input voice.

5 Claims, 4 Drawing Sheets

IMAGE FORMING APPARATUS AND METHOD

FIELD OF THE INVENTION

This invention relates to an image forming apparatus and method having a voice recognition function.

BACKGROUND OF THE INVENTION

Some conventional image forming apparatus such as facsimile machines, copiers and printers come equipped with a voice recognition function to make the apparatus more user friendly. For example, a technique that utilizes voice recognition in a case where mail is created by a facsimile machine has been disclosed (see the specification of Japanese Patent Application Laid-Open No. 11-136490, by way of example). Further, a technique that utilizes voice recognition to specify a telephone number or facsimile-transmission destination number has been disclosed (see the specification of Japanese Patent Application Laid-Open No. 2000-115327, by way of example).

With these conventional examples of an image forming apparatus, however, a problem which arises is that the voice recognition rate declines during output because of excessive operating noise.

SUMMARY OF THE INVENTION

The present invention has been proposed to solve the aforesaid problem of the prior art and its object is to provide an image forming apparatus and method in which it is possible to prevent a decline in voice recognition rate ascribable to operating noise during output.

According to the present invention, an image forming apparatus is characterized by comprising voice recognition means for recognizing entered voice, acceptance means for accepting a start request to start operation of the voice recognition means, output means for outputting prescribed output information and output discriminating means for determining whether the output means is currently producing an output, wherein if the acceptance means has accepted the start request during the output of the output information by the output means, the voice recognition means starts recognition of the entered voice after the output means suspends the output of the output information.

According to the present invention, the apparatus is characterized by further comprising receiving means for receiving the output information and storage means for storing output information received by the receiving means following the suspension of the output of the output information by the output means.

According to the present invention, the apparatus is characterized in that the output is a printout.

According to the present invention, an image forming apparatus is characterized by comprising voice recognition means for recognizing entered voice, voice-recognition discriminating means for determining whether the voice recognition means is currently performing voice recognition, printing means for printing prescribed print information, printing discriminating means for determining whether the printing means is currently printing, receiving means for receiving the print information and storage means for storing the print information, wherein if the receiving means has received another print information during voice recognition by the voice recognition means, the storage means stores the another print information and after all another print information has been stored in the storage means, the printing means prints the another print information.

According to the present invention, the apparatus is characterized by further comprising display means for notifying of the receiving state by lighting of a lamp or by a screen display, which includes a liquid crystal screen, when the receiving means is receiving the print information in a case where the voice recognition means is performing voice recognition.

According to the present invention, the apparatus is characterized in that the receiving means receives the print information, which includes image data, via a telephone line or network.

According to the present invention, the apparatus is characterized in that after the voice recognition means has completed performing voice recognition, the printing means prints the print information that has been stored in the storage means.

According to the present invention, the apparatus is characterized in that the printing discriminating means discriminates that printing is in progress during all processing relating to printing in extending from counting of number of originals prior to printing by the printing means until it becomes possible to perform the next printing operation, inclusive of sorter actuation, following printing.

According to the present invention, the apparatus is characterized in that the voice-recognition discriminating means determines that voice recognition is in progress up to voice recognition processing that includes talk-back of results of voice recognition.

An image forming apparatus according to embodiments of the present invention will be described below with reference to the accompanying drawings.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

DETAILED DESCRIPTION OF THE PREFERRED EMBODIMENTS

A preferred embodiment of an image forming apparatus and method according to the present invention will now be described with referred to the drawings.

First Embodiment

Figure 1:
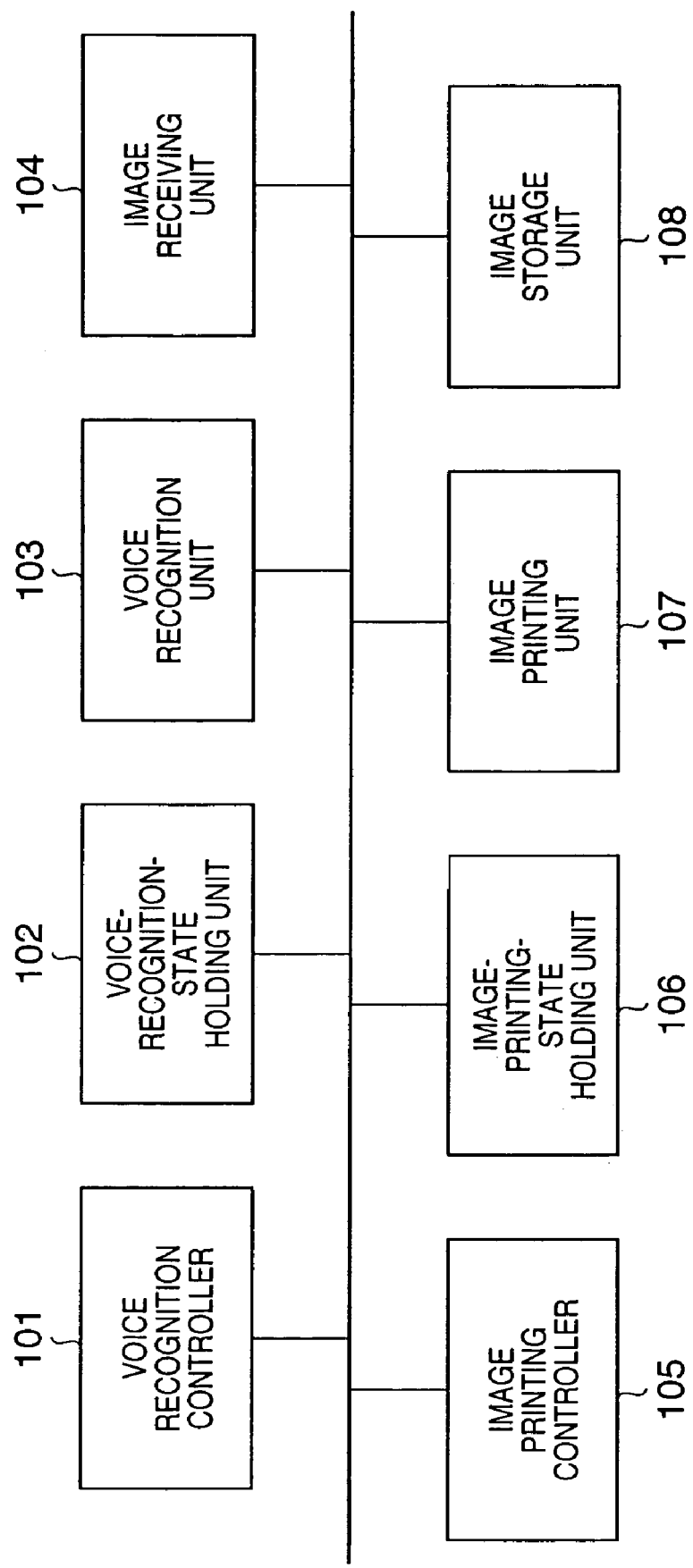
FIG. 1 is a block diagram illustrating the structure of an image forming apparatus according to a first embodiment of the present invention.

FIG. 1 is a block diagram illustrating the structure of an image forming apparatus according to a first embodiment of the present invention. As shown in FIG. 1, the apparatus includes a voice recognition controller 101 for controlling the start and stop of voice recognition; a voice recognition unit 103 for performing voice recognition; and a voice-recognition-state holding unit 102 for holding the state indicating whether the voice recognition unit 103 is in operation.

The apparatus further includes an image receiving unit 104 for receiving print data sent from outside the image forming apparatus (e.g., from a computer connected to the apparatus via a communication line or the like); an image printing controller 105 for controlling the start and stop of printing; an image printing unit 107 for printing images; an image-printing-state holding unit 106 for holding the state indicating whether the image printing unit 107 is in operation; and an image storage unit 108 for storing print data. The components from the voice recognition controller 101 to the image storage unit 108 are interconnected via a bus.

Figure 2:
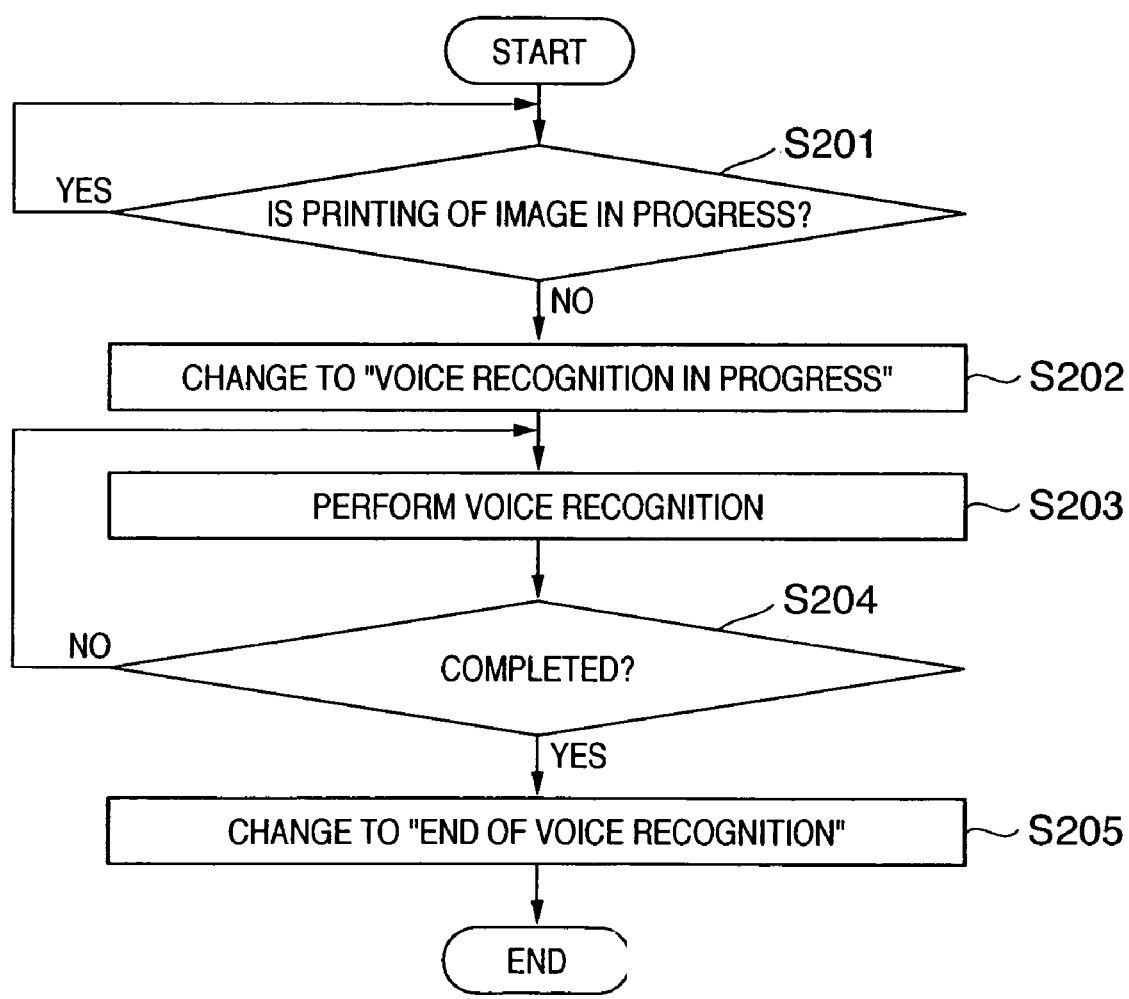
FIG. 2 is a flowchart for describing voice recognition processing in the image forming apparatus according to the first embodiment.

FIG. 2 is a flowchart for describing voice recognition processing in the image forming apparatus according to the first embodiment of the present invention. This voice recognition processing is executed in response to a voice-recognition start request issued as by having the user press a voice recognition button provided on the image forming apparatus.

First, the voice recognition controller 101 checks the state of the image-printing-state holding unit 106 and determines whether the image printing unit 107 is currently operating (step S201). If the image printing unit 107 is not operating ("NO" at step S201), control proceeds to step S202. If the image printing unit 107 is in operation ("YES" at step S201), on the other hand, then the voice recognition controller 101 continues checking the state of the image-printing-state holding unit 106 until it is determined that the image printing unit 107 is not operating. It should be noted that the image forming apparatus of the present embodiment may be so adapted as to decide that printing is in progress during all processing relating to printing, namely from counting the number of originals prior to printing by the image printing unit 107 until it becomes possible to perform the next printing operation, inclusive of sorter actuation, following printing.

Next, at step S202, the voice recognition controller 101 sets the state of the voice-recognition-state holding unit 102 to "VOICE RECOGNITION OPERATION IN PROGRESS". As a result, the voice-recognition-state holding unit 102 becomes capable of reporting, in response to an inquiry from any unit, that the voice recognition unit 103 is currently in operation. It should be noted that the image forming apparatus of this embodiment may be so adapted as to decide that voice recognition is in progress up to voice recognition processing that includes talk-back of results of voice recognition.

Next, the voice recognition unit 103 executes voice recognition processing (step S203). The voice recognition controller 101 checks the state of voice recognition state holding unit 102 and determines whether voice recognition has ended (step S204). If the response is that voice recognition has not ended ("NO" at step S204), then control returns to step S203 and voice recognition continues. On the other hand, if voice recognition has ended ("YES" at step S204), then the voice recognition controller 101 sets the state of the voice-recognition-state holding unit 102 to "END OF VOICE RECOGNITION" (step S205). Voice recognition processing ends as a result. Further, the voice-recognition-state holding unit 102 reports the fact that the voice recognition unit 103 is not operating.

Figure 3:
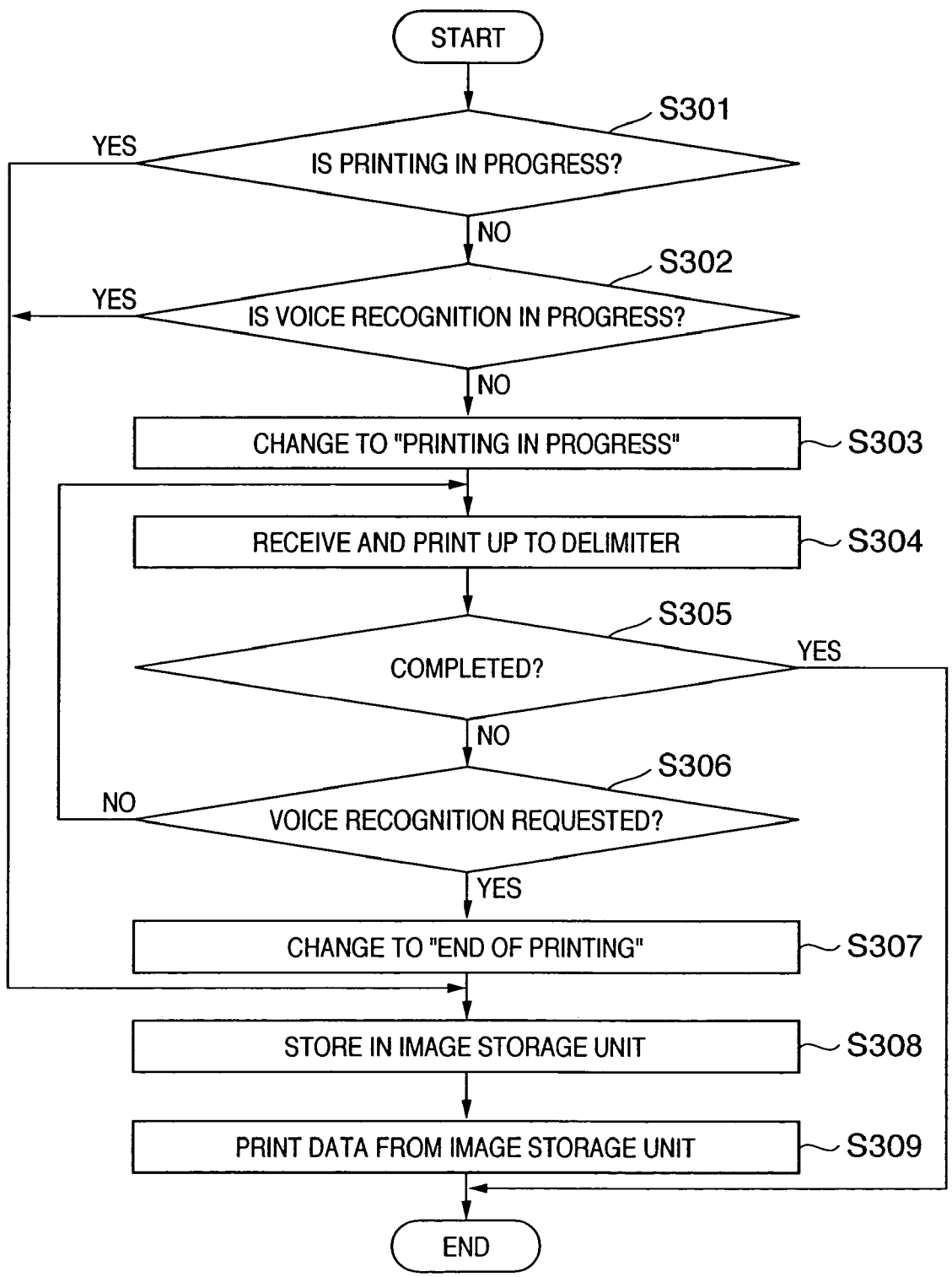
FIG. 3 is a flowchart for describing print processing in a case where the data that has been received by an image receiving unit of the image forming apparatus of the first embodiment is printed by an image printing unit.

FIG. 3 is a flowchart for describing print processing in a case where the data that has been received by the image receiving unit 104 of the image forming apparatus of the first embodiment is printed by the image printing unit 107. The image receiving unit 104 receives image data or the like transmitted from a telephone line, etc., if the image forming apparatus is employed by a facsimile function, and receives image data or text data, etc., transmitted from a LAN or the like if the image forming apparatus is employed by a printer function. That is, the image receiving unit 104 according to this embodiment is characterized in that it receives print information, which includes image data, via a telephone line or a network such as a LAN.

First, the image printing controller 105 checks the state of the image-printing-state holding unit 106 and determines whether the image printing unit 107 is currently operating (step S301). If the image printing unit 107 is found to be in operation ("YES" at step S301), control proceeds to step S308. If the image printing unit 107 is found not to be in operation ("NO" at step S301), then control proceeds to step S302.

The image printing controller 105 checks the state of the voice-recognition-state holding unit 102 at step S302 and determines whether the voice recognition unit 103 is operating. If the voice recognition unit 103 is found to be in operating ("YES" at step S302), control proceeds to step S308. If the voice recognition unit 103 is found not to be in operation ("NO" at step S302), control proceeds to step S303.

Next, at step S303, the image printing controller 105 sets the state of the image-printing-state holding unit 106 to "IMAGE PRINTING IN PROGRESS". As a result, the image-printing-state holding unit 106 reports the fact that the image printing unit 107 is currently in operation. Next, the image receiving unit 104 receives data up to a delimiter (e.g., until one line of data has been read) and the image printing unit 107 prints this data (step S304). It is then determined whether the image receiving unit 104 has received all data (step S305). If it is determined as a result that the image receiving unit 104 has received all data ("YES" at step S305), then this print processing is terminated. On the other hand, if it is determined that received data remains ("NO" at step S305), control proceeds to step S306.

At step S306, the image printing controller 105 determines whether the start of voice recognition has been requested, e.g., whether a voice recognition button has been pressed by the user. If it is determined that the start of voice recognition has not been requested ("NO" at step S306), control returns to step S304 and print processing continues to be executed. On the other hand, if it is determined that the start of voice recognition has been requested a voice recognition request has been issued ("YES" at step S306), then the image printing controller 105 sets the state of the image-printing-state holding unit 106 to "END OF IMAGE PRINTING" (step S307). As a result, the image-printing-state holding unit 106 reports that the image printing unit 107 is not in operation.

At step S308, the image receiving unit 104 stores data read from this point onward in the image storage unit 108. After all data has been received and stored, the data in the image storage unit 108 is printed by the image printing unit 107 (step S309). Thus, the image processing apparatus according to the present invention is characterized by having the image receiving unit 104 for receiving print information and the image storage unit 108 for storing print information received by the image receiving unit 104 following suspension of printing of the print information by the image printing unit 107.

Further, the image forming apparatus according to the present invention is characterized in that after the voice recognition unit 103 finishes voice recognition, print information that has been stored in the image storage unit 108 is printed by the image printing unit 107.

Furthermore, the image forming apparatus according to this embodiment has the voice recognition unit 103 for recognizing entered voice, the image printing unit 107 for printing prescribed print information, and the image storage unit 108 for storing print information. It is determined whether the voice recognition unit 103 is performing voice recognition, it is determined whether the image printing unit 107 is performing printing, and print information is received by the image receiving unit 104. If print information is received during printing of print information by the image printing unit 107 or during voice recognition by the voice recognition unit 103, the print information is stored in the image storage unit 108. After all of the print information has been stored in the image storage unit 108, this print information is printed.

The printing processing executed at step S309 will be described in detail with reference to the flowchart of FIG. 4.

Figure 4:
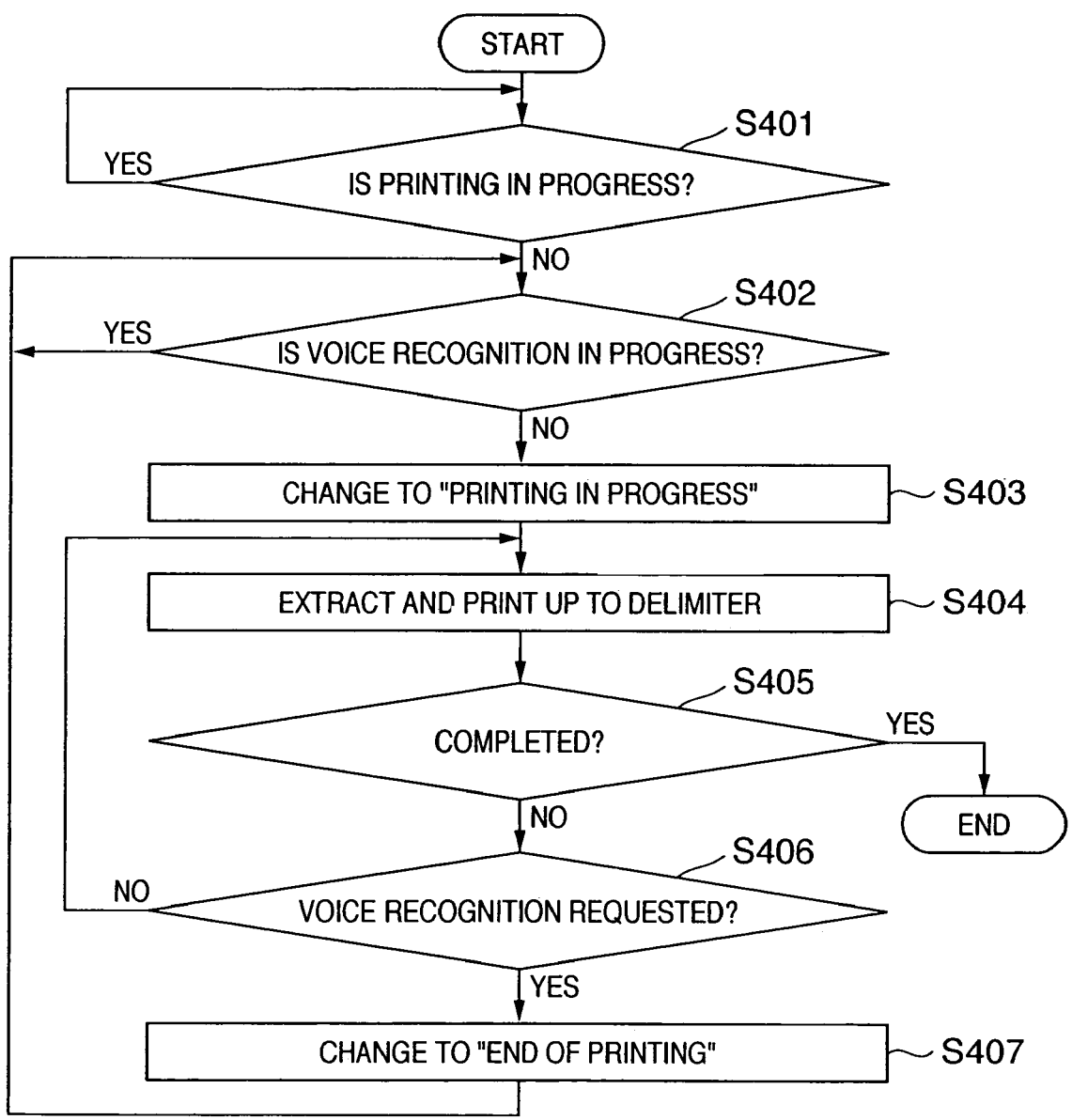
FIG. 4 is a flowchart for describing print processing in a case where data that has been stored in an image storage unit of the image forming apparatus of the first embodiment is printed by the image printing unit.

FIG. 4 is a flowchart for describing print processing in a case where data that has been stored in the image storage unit 108 of the image forming apparatus of the first embodiment is printed by the image printing unit 107. This processing is executed at step S309 in FIG. 3 or in a case where the user has pressed an image print button.

First, the image printing controller 105 checks the state of the image-printing-state holding unit 106 and determines whether the image printing unit 107 is in operation (step S401). If the image printing unit 107 is found to be not operating ("NO" at step S401), control proceeds to step S402. If the image printing unit 107 is found to be operating ("YES" at step S401), then the image printing controller 105 continues to check the state of the image-printing-state holding unit 106 until the unit is found not to be in operation.

Next, at step S402, the image printing controller 105 checks the state of the voice-recognition-state holding unit 102 and determines whether the voice recognition unit 103 is in operation. If the voice recognition unit 103 is found not to be in operation ("NO" at step S402), control proceeds to step S403. On the other hand, if the voice recognition unit 103 is found to be in operating ("YES" at step S402), then the image printing controller 105 continues to check the state of the voice-recognition-state holding unit 102 until the unit is found not to be in operation.

Next, at step S403, the image printing controller 105 sets the state of the image-printing-state holding unit 106 to "IMAGE PRINTING IN PROGRESS". As a result, the image-printing-state holding unit 106 reports the fact that the image printing unit 107 is currently in operation. Next, the image printing unit 107 extracts data from the image storage unit 108 up to a delimiter (e.g., one line of data) and prints this data (step S404).

The image printing unit 107 then determines whether all of the data that has been stored in the image storage unit 108 has been printed (step S405). If it is determined that all of the data has been printed ("YES" at step S405), then this print processing is terminated. On the other hand, if it is determined that data remains ("NO" at step S405), then the image printing controller 105 determines whether the start of voice recognition has been requested, e.g., whether a voice recognition button has been pressed by the user (step S406). If it is determined that a voice recognition request has not been issued ("NO" at step S406), control returns to step S404 and print processing continues to be executed. On the other hand, if it is determined that a voice recognition request has been issued ("YES" at step S406), then the image printing controller 105 sets the state of the image-printing-state holding unit 106 to "END OF IMAGE PRINTING" (step S407). As a result, the image-printing-state holding unit 106 reports the fact that the image printing unit 107 is not currently in operation.

Further, the image forming apparatus according to this embodiment further includes a display unit. When the image receiving unit 104 is receiving information while the voice recognition unit 103 is in the process of executing voice recognition, the display unit notifies of the receiving state by lighting of a lamp or by a screen display that includes a liquid crystal panel.

Second Embodiment

The first embodiment has been described with regard to a printing operation as an output operation. However, this does not impose a limitation upon application of the invention. The invention is also applicable to other outputs involving large operating sounds (e.g., a display operation or the like).

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

Thus, according to the present invention as described above, a decline in the recognition rate of voice recognition ascribable to operating sound during output can be prevented by starting voice recognition after the output operation has been suspended.

The present invention is not limited to the above embodiments and various changes and modification can be made within the spirit and scope of the present inventions. Therefore, to apprise the public of the scope of the present invention, the following claims are made.

What is claimed is:

1. An image forming apparatus comprising:
   voice recognition means for recognizing entered voice;
   acceptance means for accepting a start request to start operation of said voice recognition means;
   printing means for printing a document; and
   control means for controlling said voice recognition means and said printing means so that if said acceptance means accepts the start request while said printing means is in operation, said printing means suspends the printing operation and then said voice recognition means starts the voice recognition.

2. The apparatus according to claim 1, further comprising:
   receiving means for receiving print data of the document; and
   storage means for storing the print data received by said receiving means while the printing operation is suspended.

3. An image forming method in an image forming apparatus having voice recognition means for recognizing entered voice and printing means for printing a document, said method comprising the steps of:
   accepting a start request to start voice recognition operation;
   determining whether or not the printing means is in operation; and
   controlling the voice recognition means and the printing means so that upon acceptance of the start request while the printing means is in operation, the printing means suspends the printing operation and then the voice recognition means starts the voice recognition.

4. The method according to claim 3, wherein the image forming apparatus further has storage means, said method further comprising the steps of:
   receiving print data of the document; and
   storing, in the storage means, the received print data while the printing operation is suspended.

5. A program for causing a computer to control an image forming apparatus having voice recognition means for recognizing entered voice and printing means for printing a document, said program comprising the steps of:
   accepting a start request to start voice recognition operation;
   determining whether or not the printing means is in operation; and
   controlling the voice recognition means and the printing means so that upon acceptance of the start request while the printing means is in operation, the printing means suspends the printing operation and then the voice recognition means starts the voice recognition.

* * * * *